United States Patent
Wesselkamper et al.

(10) Patent No.: US 9,218,505 B1
(45) Date of Patent: Dec. 22, 2015

(54) PROGRAMMABLE INTEGRATED CIRCUIT WITH DPA-RESISTANT DECRYPTION

(71) Applicant: Xilinx, Inc., San Jose, CA (US)

(72) Inventors: James D. Wesselkamper, Albuquerque, NM (US); James B. Anderson, Shallowater, TX (US); Jason J. Moore, Albuquerque, NM (US); Edward S. Peterson, Rio Rancho, NM (US)

(73) Assignee: XILINX, INC., San Jose, CA (US)

( * ) Notice: Subject to any disclaimer, the term of this patent is extended or adjusted under 35 U.S.C. 154(b) by 225 days.

(21) Appl. No.: 13/756,151

(22) Filed: Jan. 31, 2013

(51) Int. Cl.
*G06F 21/00* (2013.01)
*G06F 21/72* (2013.01)

(52) U.S. Cl.
CPC ..................................... *G06F 21/72* (2013.01)

(58) Field of Classification Search
CPC .. G06F 21/10; G06F 21/72; G06F 2221/2107
USPC ........................................................ 713/189
See application file for complete search history.

(56) References Cited

U.S. PATENT DOCUMENTS

| 7,219,325 | B1 | 5/2007 | Lysaght | |
| 7,428,651 | B2 * | 9/2008 | Elbe et al. | 713/400 |
| 7,474,559 | B1 | 1/2009 | Lakkapragada et al. | |
| 7,626,861 | B1 | 12/2009 | Lakkapragada et al. | |
| 7,711,933 | B1 | 5/2010 | Lysaght | |
| 8,095,800 | B2 * | 1/2012 | Creary et al. | 713/189 |
| 2009/0119503 | A1 * | 5/2009 | Isaakian et al. | 713/153 |
| 2009/0169000 | A1 * | 7/2009 | Shintani | 380/210 |

OTHER PUBLICATIONS

U.S. Appl. No. 12/791,608, filed Jun. 1, 2010, Bridgford et al.
Helion Technology Limited, *RSA and Modular Exponentiation cores*, downloaded Dec. 13, 2012, pp. 1-2, available from Helion Technology Limited at <http://www.heliontech.com/modexp.htm>.

* cited by examiner

*Primary Examiner* — Ali Abyaneh
(74) *Attorney, Agent, or Firm* — LeRoy D. Maunu

(57) ABSTRACT

Approaches for configuring a programmable integrated circuit (IC) are disclosed. Encrypted configuration data is input to the programmable IC, and the encrypted configuration data is stored in configuration memory of the programmable IC. As the encrypted configuration data is input, a determination is made as to whether or not the encrypted configuration data is authentic. In response to the encrypted configuration data being authentic, the encrypted configuration data is read from the configuration memory and decrypted, and the decrypted configuration data is stored back in the configuration memory.

20 Claims, 5 Drawing Sheets

PROGRAMMABLE INTEGRATED CIRCUIT WITH DPA-RESISTANT DECRYPTION

TECHNICAL FIELD

The disclosure generally relates to securely configuring a programmable integrated circuit.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that are programmable to implement logic functions. The function blocks of CPLDs and FPGAs and interconnect lines are configured by data stored in a configuration memory of the respective devices.

Designs implemented in programmable logic have become complex. Due to the time and investment required for design and debugging, it is desirable to protect such designs from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing (exclusive ORing) blocks of data with blocks of the one-time pad (OTP). These approaches require provision of a key, corresponding to the particular encryption algorithm, and the key must be protected from unauthorized discovery.

A decryption key can be stored in nonvolatile memory of a programmable integrated circuit. An encrypted bitstream can then be loaded into the IC and decrypted using the key within the programmable logic. This prevents an attacker from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, the amount of current used by a device is monitored while the device is decrypting the bitstream. During normal operation, the amount of current, and therefore power, used by a device varies depending on the logic gates activated at a given time. By monitoring variations in the power consumption while the device is decrypting a configuration bitstream, the attacker can identify decryption operations performed and determine the decryption key. In another type of attack, an attacker attempts to guess a key, password, or authentication code using many trial-and-error attempts. The attacker may attempt to determine the key value or force the device to accept tampered data as if it were legitimate.

SUMMARY

A method of configuring a programmable integrated circuit (IC) includes inputting encrypted configuration data to the programmable IC. The encrypted configuration data is stored in configuration memory of the programmable IC. The configuration memory programs configurable logic of the programmable IC. The method determines whether or not the encrypted configuration data is authentic. In response to the encrypted configuration data being authentic, the encrypted configuration data is read from the configuration memory and decrypted into decrypted configuration data. The decrypted configuration data is then stored back in the configuration memory.

A circuit includes a configuration memory and a configuration control circuit coupled to the configuration memory. The configuration control circuit is configured to input a configuration bitstream. An authentication circuit is coupled to the configuration control circuit and is configured to input the configuration bitstream and to calculate an expected digest from a public key and signature in the configuration bitstream. A hash calculation circuit is coupled to the configuration control circuit and is configured to input the configuration bitstream and to calculate an actual digest from encrypted data in the configuration bitstream. A decryptor circuit is coupled to the configuration control circuit. The configuration control circuit is further configured to store the encrypted configuration data in the configuration memory, and to determine whether or not the encrypted configuration data is authentic based on the expected digest and the actual digest. In response to the encrypted configuration data being authentic, the configuration control circuit reads the encrypted configuration data from the configuration memory and stores decrypted configuration data back in the configuration memory. The decryptor circuit is configured to decrypt the encrypted configuration data read from the configuration memory into the decrypted configuration data.

Another method of configuring a programmable integrated circuit (IC) includes inputting a value of a decryption flag to the programmable IC, inputting configuration data to the programmable IC, and storing the configuration data in configuration memory of the programmable IC. The configuration memory programs configurable logic of the programmable IC. The method determines whether or not the configuration data is authentic. In response to the configuration data being authentic, the configuration data is read from the configuration memory. In response to the value of a decryption flag indicating that the configuration data is encrypted, the encrypted configuration data is decrypted into decrypted configuration data, and the decrypted configuration data is stored back in the configuration memory. In response to the value of a decryption flag indicating that the configuration data is not encrypted, the configuration data is stored back in the configuration memory.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Differential Power Analysis (DPA) attacks on FPGAs allow the adversary to discover the key stored in battery backed RAM (BBR) or in the eFUSEs. DPA involves running statistical analysis on a large set of power supply traces that are captured during decryption of various sets of cipher text. Once the key is discovered, the design is no longer confidential and may be subjected to reverse engineering efforts.

Some security measures prevent attacks that use invalid configuration data by permanently disabling decryption on a device after a certain amount of invalid data has been observed. Permanently disabling a device has a negative impact on the usability of the device in some applications.

The disclosed approaches for preventing the use of invalid data in DPA attacks authenticate the configuration data before it is sent to the decryptor where side-channel information can be used to recover the key. The authentication of the encrypted configuration data uses a public-private key algorithm, so that the FPGA does not store a secret key that can be recovered from side channel attacks. As the encrypted configuration data is being authenticated, it is stored in configuration memory of the FPGA. In response to finding the encrypted configuration data to be authentic, the encrypted configuration data is read back from the configuration memory, decrypted, and stored back in the configuration memory.

Figure 1:
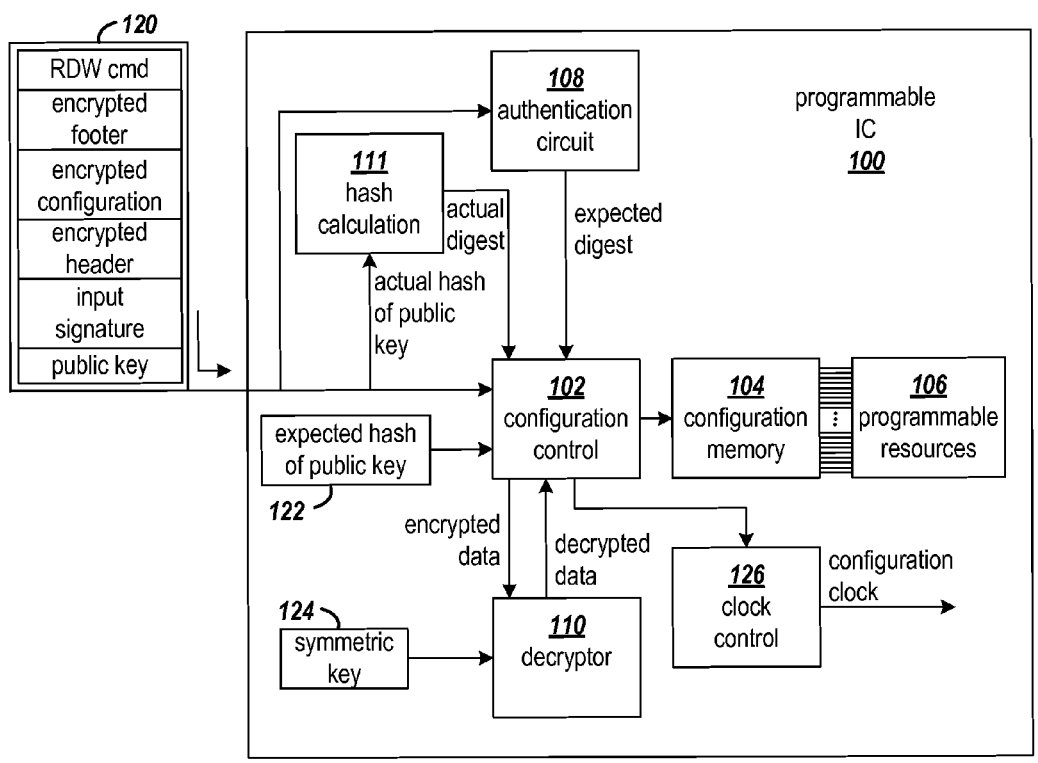
FIG. 1 shows a circuit for authenticating configuration data prior to decryption.

FIG. 1 shows a circuit for authenticating configuration data prior to decryption. The example circuit is part of a programmable IC 100, such as an FPGA. The programmable IC includes configuration control circuit 102, configuration memory 104, and programmable resources 106. The configuration control circuit controls the storing of configuration data in the configuration memory. The state of the configuration memory controls the functions, interconnections, and input and output of the programmable resources.

In an example implementation, asymmetric key cryptography is used to determine whether or not the encrypted configuration data is authentic. The input configuration bitstream 120 includes a public key, an input signature, an encrypted header, encrypted configuration data, an encrypted footer, and a read-decrypt-write (RDW) command. The public key and the input signature are used in authenticating the encrypted header, encrypted configuration data, and the encrypted footer. The RDW command is used to signal that the encrypted configuration data can be read back from the configuration memory, decrypted, and written back to the configuration memory.

The hash calculation circuit 111 reads the public key from the input configuration bitstream and calculates a hash value from the input public key. The hash calculation circuit inputs the calculated actual hash value of the public key to the configuration control circuit 102. In an example implementation, the hash calculation circuit calculates an SHA-3 hash value. The configuration control circuit 102 compares the calculated hash value to the expected hash value 122. The expected hash value may be stored in an eFUSE register on the programmable IC. In response to the calculated hash value matching the expected hash value, the configuration control circuit continues with the configuration. Otherwise, the configuration process may be halted.

The configuration control circuit 102 next signals the authentication circuit 108 to calculate an expected digest using the input signature and the public key, the input signature having been previously generated using a private key and a digest of the encrypted parts of the configuration bitstream. The encrypted header, encrypted configuration data, and the encrypted footer are covered by the signature. In an example implementation, RSA (Rivest-Shamir-Adleman) is used as the authentication algorithm. Other algorithms would change resource estimates and configuration times. One such alternative would be an elliptic curve cryptographic (ECC) algorithm.

The configuration data following the public key and the input signature is input to the hash calculation circuit 111, and the hash calculation circuit calculates the actual digest from the input configuration data. As the hash calculation circuit is calculating the actual digest, the configuration control circuit 102 stores the encrypted header in a buffer (not shown), writes the encrypted configuration data to the configuration memory 104, and also stores the encrypted footer in a buffer (not shown). The buffer (not shown) may be a small dedicated random access memory coupled to the configuration control circuit for storing the header and footer.

Once input of the configuration bitstream 120 is complete, the configuration control circuit 102 will have buffered and stored the encrypted header, encrypted configuration data, and encrypted footer, the authentication circuit 108 will have computed the expected digest, and the hash calculation circuit 111 will have computed the actual digest. The expected digest is input to the configuration control circuit from the authentication circuit, and the actual digest is input to the configuration control circuit from the hash calculation circuit. If the expected digest matches the actual digest, the encrypted parts of the configuration bitstream are deemed to be authentic. If the expected digest does not match the actual digest, configuration of the programmable IC may be aborted.

In response to the RDW command, the configuration control circuit 102 initiates the decrypting of the buffered encrypted header and the encrypted configuration stored in the configuration memory 104. The buffered encrypted header is provided to the decryptor circuit 110, and the decryptor circuit uses symmetric key 124 to decrypt the encrypted header. The header includes commands for setting up configuration of the programmable IC. The particular setup commands are particular to the circuit to be implemented on the programmable IC and particular to the type and class of programmable IC.

In an example implementation key rolling is used for further protection. The symmetric key 124 is the initial key, which may be stored in eFUSEs or in on-chip RAM, and the initial synthetic initialization vector (SIV) and decryption length count (DLCs) are read from a plaintext portion of the configuration bitstream. Subsequent key data sets (key, SIV, and DLC) are in the ciphertext portion of the configuration bitstream. Further description of key rolling in a configuration bitstream is described in co-pending patent application Ser. No. 12/900,805, filed Oct. 8, 2010, entitled, "A Method and Integrated Circuit for Secure Encryption and Decryption," the entire contents of which are incorporated herein by reference and which is assigned to the assignee of the present patent application/patent.

Once the header is decrypted, the configuration control circuit 102 begins reading encrypted configuration data from the configuration memory 104 and providing the encrypted configuration data to the decryptor circuit 110. The decryptor circuit decrypts the configuration data and returns the decrypted configuration data to the configuration control circuit. The configuration control circuit in turn writes the decrypted configuration data back to the configuration memory.

In one implementation, the decryption of the encrypted configuration data proceeds frame-by-frame through the configuration memory. For example, in some FPGAs from XILINX, Inc., the configuration memory is organized into frames, and the memory cells in each frame control a particular subset of programmable resources of the FPGA. The configuration control circuit reads each frame of encrypted configuration data and writes the decrypted frame of configuration back to the same frame in the FPGA.

Once all the encrypted configuration data in the configuration memory has been decrypted and written back to the configuration memory, the configuration control circuit decrypts the buffered encrypted footer. In an example implementation, the footer contains a start-up command, which causes the programmable IC to begin operating as configured by the configuration memory.

In another feature of the programmable IC, the rate of the configuration clock signal is controlled to reduce the time required to complete configuration. The input of the configuration bitstream 120 may be limited by the clock rate of the device (not shown) on which the configuration bitstream is stored (e.g., a flash memory). During input of the configuration bitstream, the configuration control circuit signals the clock control circuit 126 to output a configuration clock signal at a rate suitable for the input device. In response to completing input of the configuration bitstream and the encrypted configuration data having been stored in the configuration memory, the configuration control circuit signals the clock control circuit to increase the clock rate to a rate that is suitable for reading from the configuration memory, decrypting, and writing back to the configuration memory.

The configuration control circuit may include additional circuitry (not shown) for performing a cyclic redundancy check on the decrypted configuration data before storing the data in the configuration memory. For plaintext configuration bitstreams, in another implementation the programmable IC is configured to authenticate the input configuration bitstream without performing decryption.

Figure 2:
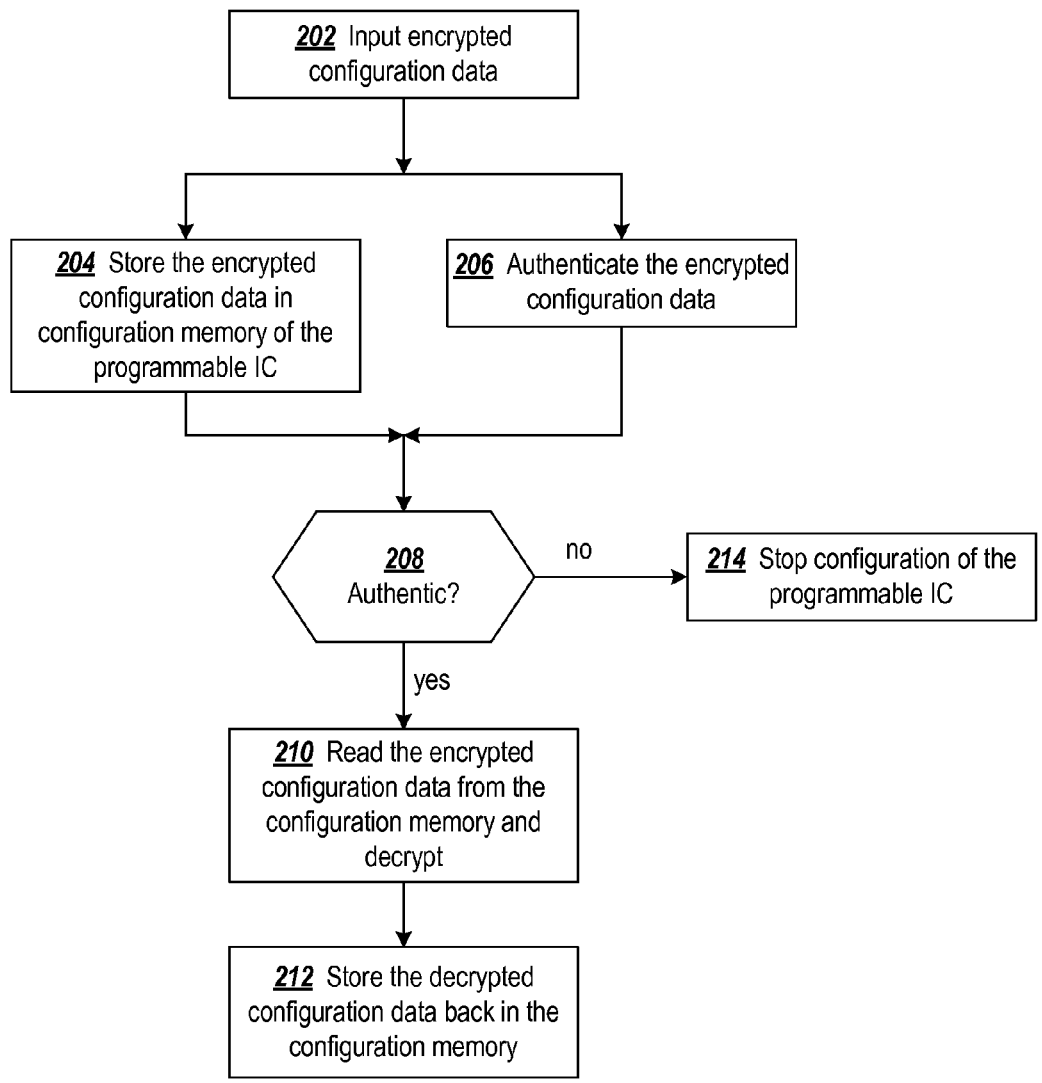
FIG. 2 is a flowchart of a process for authenticating configuration data prior to decryption.

FIG. 2 is a flowchart of a process for authenticating configuration data prior to decryption. At block 202 encrypted configuration data is input to a programmable IC. As the input encrypted configuration data is stored in configuration memory of the programmable IC at block 204, the encrypted configuration data concurrently undergoes authentication at block 206. In response to finding the input encrypted configuration data to be authentic, decision block 208 directs the process to block 210 where the encrypted configuration data is read from the configuration memory. At block 212, the decrypted configuration data is written back to the configuration memory. If the input encrypted configuration data is not authentic, decision block 208 directs the process to block 214 where configuration of the programmable IC is stopped.

The process of FIG. 2 shows authentication of the encrypted configuration data being performed before decryption. This approach protects against DPA attacks since DPA attacks may rely on providing inauthentic bitstreams to be decrypted. Since the disclosed approaches detect that an inauthentic bitstream has been input and stop the configuration process before any decryption is performed, the DPA attack will not observe any decryption of the encrypted configuration data with a protected key.

Figure 3:
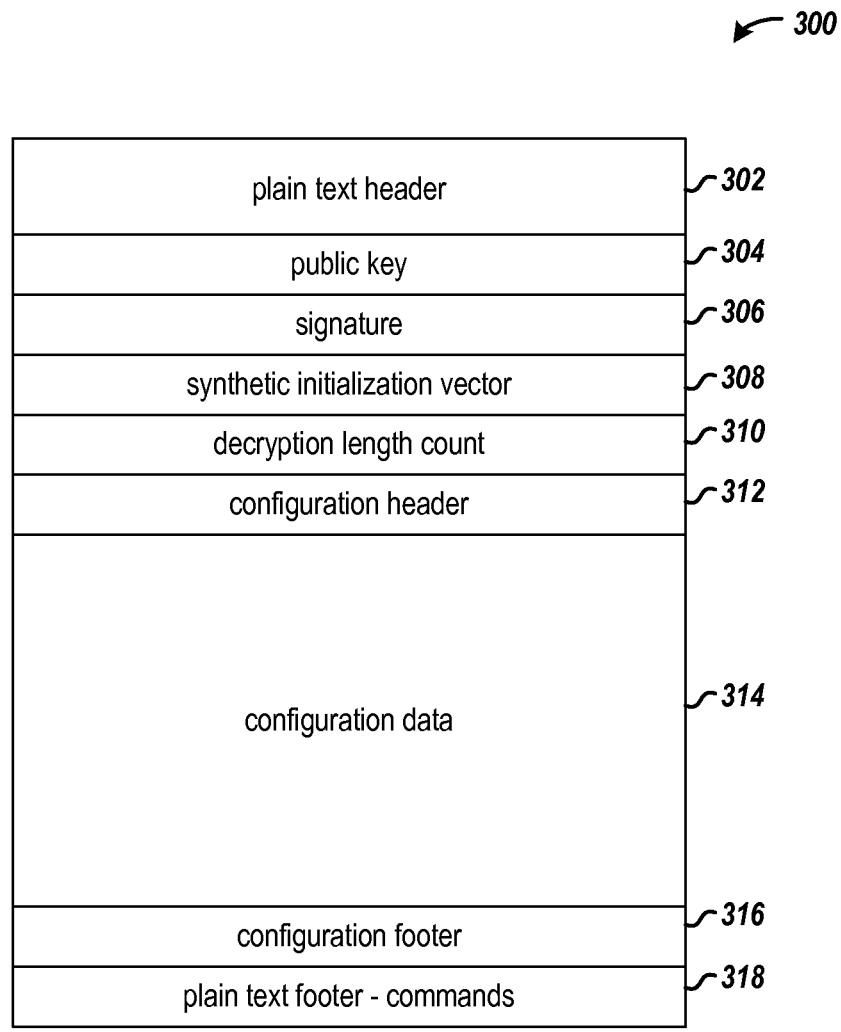
FIG. 3 shows an example of the format and content of a configuration bitstream according to an example implementation.

FIG. 3 shows an example of the format and content of a configuration bitstream 300 according to an example implementation.

The plain text header 302 contains device-specific setup commands, a bit that indicates whether or not the bitstream contains encrypted data (DEC), and bits that select a configuration clock rate.

The public key 304 is 2048 bits, along with 448 bits of SHA3 padding.

The signature 306 is 2048 bits and covers the SIV 308, the DLC 310, the configuration header 312, configuration data 314, and the configuration footer 316.

The SIV 308 is 96 bits and is the first initialization vector that will be used to decrypt the bitstream. For key rolling, subsequent initialization vectors are embedded in the bitstream.

The DLC 310 is 32 bits and indicates the number of words in the first decryption message for key rolling. Subsequent Decryption Length Counts are embedded in the bitstream.

If the DEC bit in the plaintext header is set, the encrypted portion of the configuration bitstream begins with the configuration header 312. The configuration header is 32 words and includes device-specific commands for setting up the configuration.

The configuration data 314 is also encrypted if the DEC bit in the plaintext header is set. In an example implementation, if a TEST_MODE bit is asserted in the DLC, the configuration control circuit will expect 24 frames of configuration data. If the TEST_MODE bit is not asserted, then the configuration control circuit will write configuration data to the configuration memory until there is an indication that the end of the device has been reached.

The configuration footer 316 includes 160 words of commands for causing the programmable IC to commence operating and is also encrypted if the DEC bit in the plaintext header is set. For example, the configuration footer includes a start-up command, which causes the programmable IC to begin operating as configured by the configuration memory.

The plain text footer 318 includes further commands, such as commands for loading slave super logic regions and daisy chaining FPGAs. The final command in the plaintext footer is the RDW command, which signals to the configuration control logic to begin the process of reading encrypted configuration data from the configuration memory, decrypting the configuration data, and writing the decrypted configuration data back to the configuration memory. In an example implementation, the plaintext footer includes a command that switches the configuration clock signal to a higher frequency than the frequency at which the encrypted configuration data was input to the programmable IC.

Figure 4:
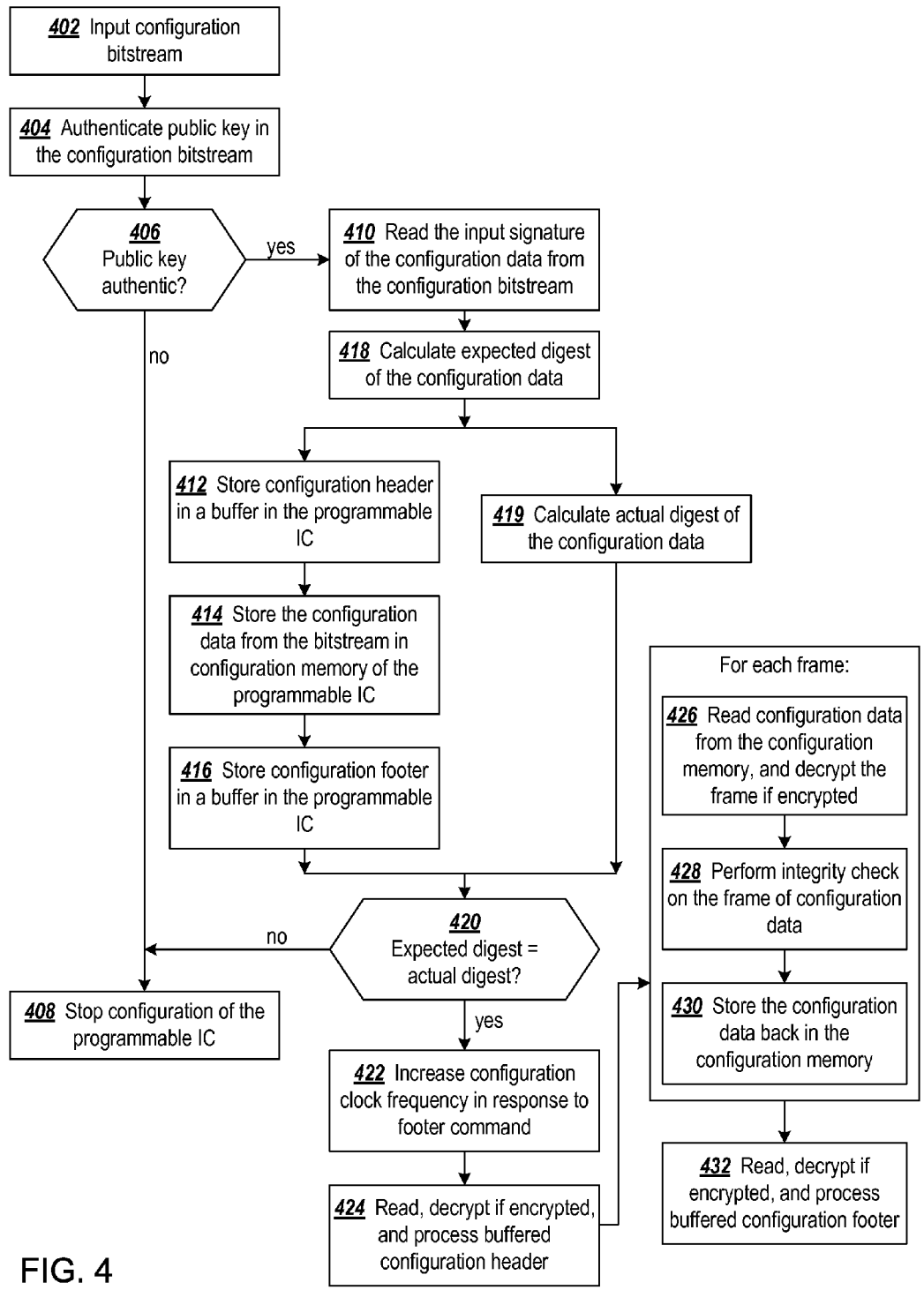
FIG. 4 shows a flowchart of a detailed process for authenticating configuration data prior to decryption.

FIG. 4 shows a flowchart of a detailed process for authenticating configuration data prior to decryption. At block 402, a configuration bitstream is input, and at block 404, the public key in the configuration bitstream is authenticated. Authentication of the public key includes calculating a hash value from the input public key and comparing the calculated hash value to an expected hash value that is stored in the programmable IC. In response to the calculated hash value matching the expected hash value, the public key in the configuration bitstream is determined to be authentic, and decision block 406 directs the process to block 410.

At block 410, an input signature is read from the input configuration bitstream, the input signature in the configuration bitstream having been previously generated using a private key to encrypt a digest of the covered data. Block 418 computes an expected digest of the configuration data using the public key and input signature in the configuration bitstream. The functions of blocks 412, 414, and 416 are performed in parallel with the function of block 419, which calculates an actual digest from the configuration bitstream. At block 412, the configuration header from the input configuration bitstream is stored in a buffer on the programmable IC. Block 414 stores configuration data from the configuration bitstream in configuration memory of the programmable IC, and block 416 stores the configuration footer from the configuration bitstream into a buffer on the programmable IC.

At block 419, the process calculates the actual digest from the configuration bitstream. If the expected digest equals the actual digest, decision block 420 directs the process to block 422. In response to a command in the plaintext footer of the configuration bitstream, the configuration clock frequency is increased. The configuration clock rate may be increased since input from a slower external device is no longer needed.

At block 424, the process reads the buffered configuration header. If the DEC bit from the plaintext header indicates that the configuration header is encrypted, the configuration is also decrypted at block 424 using a symmetric key preconfigured on the programmable IC. Any device-specific setup configuration commands in the configuration header are also executed.

The processing of blocks 426, 428, and 430 is performed for each frame of configuration data in the programmable IC. At block 426, the process reads a frame of configuration data from the configuration memory of the programmable IC, and the configuration data is decrypted if the DEC bit from the plaintext header indicates that the configuration data is encrypted. At block 428, an integrity check, such as a cyclic redundancy check, is performed on the configuration data. If the data is correct, at block 430 the configuration data is stored back in the same frame of the programmable IC from which the configuration data was read.

At block 432, the buffered configuration footer is read, and if the DEC bit from the plaintext header indicates that the configuration footer is encrypted, the footer is also decrypted. The device-specific commands in the footer may then be processed.

If either decision block 406 finds the public key to be inauthentic or decision block 420 finds the input configuration data to be inauthentic, configuration of the programmable IC is halted at block 408.

Figure 5:
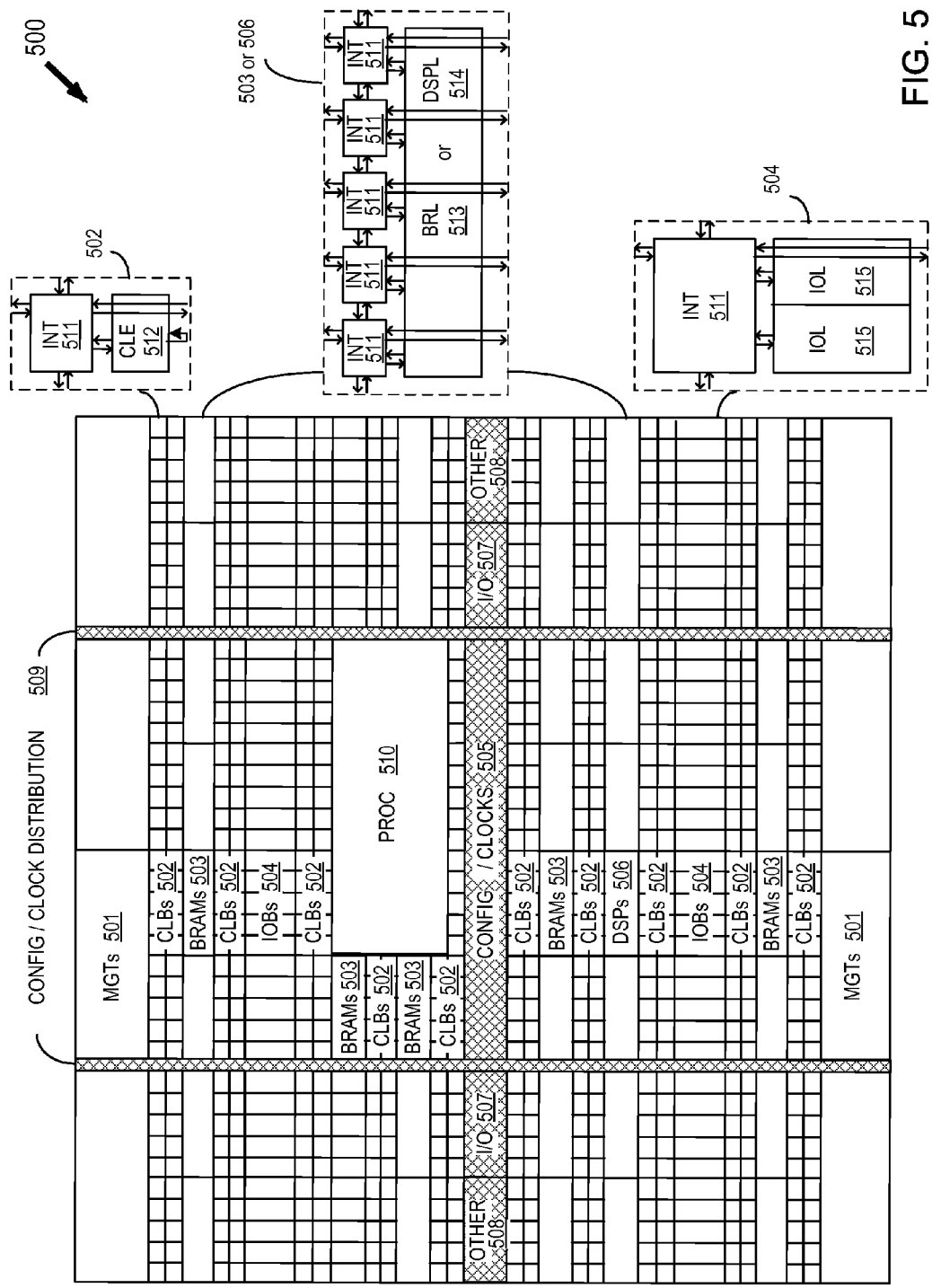
FIG. 5 is a block diagram of an example FPGA.

FIG. 5 is a block diagram of an example FPGA. FPGAs can include several different types of programmable logic blocks in the array. For example, FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, e.g., clock ports, and other programmable logic 508 such as digital clock managers, analog-to-digital converters, system monitoring logic, and so forth. Some FPGAs also include dedicated processor blocks (PROC 510) and internal and external reconfiguration ports (not shown).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 506 can include a DSP logic element (DSPL 514) in addition to an appropriate number of programmable interconnect elements. An 10B 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured FPGA, a horizontal area near the center of the die (shown shaded in FIG. 5) is used for configuration, clock, and other control logic. Vertical areas 509 extending from this horizontal area are used to distribute the clocks and configuration signals across the breadth of the FPGA.

Some FPGAs utilizing the architecture illustrated in FIG. 5 include additional logic blocks that disrupt the regular row structure making up a large part of the FPGA. The additional logic blocks can be programmable blocks and/or dedicated logic. For example, the processor block PROC 510 shown in FIG. 5 spans several rows of CLBs and BRAMs.

Note that FIG. 5 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic.

The examples described herein are thought to be applicable to a variety of systems for protecting against DPA attacks. Other aspects and embodiments will be apparent to those skilled in the art from consideration of the specification. The embodiments may be implemented as one or more processors configured to execute software, as an application specific integrated circuit (ASIC), or as a logic on a programmable logic device, for example. It is intended that the specification and the illustrated circuits and methods be considered as examples only, with a true scope of the invention being indicated by the following claims.

What is claimed is:

1. A method of configuring a programmable integrated circuit (IC), comprising:

inputting encrypted configuration data to the programmable IC, wherein the programmable IC includes configurable logic and a configuration memory, and a state of the configuration memory controls functions of the configurable logic;

storing the encrypted configuration data in the configuration memory of the programmable IC, wherein the configuration memory programs the configurable logic of the programmable IC;

determining whether or not the encrypted configuration data is authentic;

in response to the encrypted configuration data being authentic:

reading the encrypted configuration data from the configuration memory;

decrypting the encrypted configuration data into decrypted configuration data;

storing the decrypted configuration data back in the configuration memory; and operating the programmable IC having the configurable logic of the programmable IC programmed by the decrypted configuration data in the configuration memory.

2. The method of claim 1, further comprising, in response to the encrypted configuration data not being authentic, halting configuration of the programmable IC.

3. The method of claim 1, further comprising:

inputting a key to the programmable IC;

determining whether or not the input key is authentic;

in response to the input key being authentic, performing the storing of the encrypted configuration data in the configuration memory and the determining of whether or not the encrypted configuration data is authentic; and in response to the input key not being authentic, halting configuration of the programmable IC.

4. The method of claim 3, wherein the determining of whether or not the input key is authentic includes:

storing a hash value of an asymmetric public key in non-volatile storage within the programmable IC;

computing a hash value from the input key; and comparing the computed hash value to the stored hash value of the asymmetric public key.

5. The method of claim 1, wherein the determining whether or not the encrypted configuration data is authentic uses asymmetric key cryptography.

6. The method of claim 1, further comprising:

generating a signature of the encrypted configuration data using a digest of the encrypted configuration data and a private key;

inputting the signature and a public key to the programmable IC;

generating an expected digest by the programmable IC from the signature and the public key;

generating an actual digest from the input encrypted configuration data; and comparing the actual digest to the expected digest.

7. The method of claim 1, wherein the decrypting the encrypted configuration data includes decrypting the encrypted configuration data using a plurality of keys in the configuration data.

8. The method of claim 1, further comprising performing a cyclic redundancy check on the decrypted configuration data before storing the decrypted configuration data in the configuration memory.

9. The method of claim 1, further comprising:

operating the programmable IC at a first clock rate during the inputting of the encrypted configuration data, the storing of the encrypted configuration data, and the determining whether or not the encrypted configuration data is authentic; and operating the programmable IC at a second clock rate during the reading, decrypting, and storing of the decrypted configuration data;

wherein the second clock rate is faster than the first clock rate.

10. The method of claim 1, wherein:

the encrypted configuration data includes a configuration header, configuration data for programming programmable resources of the programmable IC, and a configuration footer;

the method further includes storing the configuration header and the configuration footer in a buffer on the programmable IC; and the determining whether or not the encrypted configuration data is authentic includes:

generating a signature using a private key and a digest of the encrypted configuration data;

inputting the signature and a public key to the programmable IC;

generating an expected digest by the programmable IC from the signature and the public key;

generating an actual digest by the programmable IC from the encrypted configuration data; and comparing the actual digest to the expected digest.

11. A circuit, comprising:

a configuration memory;

programmable resources coupled to the configuration memory, wherein a state of the configuration memory controls functions of the programmable resources;

a configuration control circuit coupled to the configuration memory and configured to input a configuration bitstream;

an authentication circuit coupled to the configuration control circuit and configured to input the configuration bitstream and to calculate an expected digest from a public key and signature in the configuration bitstream;

a hash calculation circuit coupled to the configuration control circuit and configured to input the configuration bitstream and to calculate an actual digest from encrypted data in the configuration bitstream; and a decryptor circuit coupled to the configuration control circuit;

wherein the configuration control circuit is further configured to:

store the encrypted configuration data in the configuration memory;

determine whether or not the encrypted configuration data is authentic based on the expected digest and the actual digest; and in response to the encrypted configuration data being authentic:

read the encrypted configuration data from the configuration memory; and store decrypted configuration data back in the configuration memory; and wherein the decryptor circuit is configured to decrypt the encrypted configuration data read from the configuration memory into the decrypted configuration data, and the programmable resources are configured to operate responsive to the configuration memory as programmed by the decrypted configuration data.

12. The circuit of claim 11, wherein the configuration control circuit is further configured to, in response to the encrypted configuration data not being authentic, halt configuration of the programmable resources of a programmable integrated circuit (IC).

13. The circuit of claim 11, wherein:
the hash calculation circuit is further configured to input the public key and generate a first hash value from the public key; and
the configuration control circuit is further configured to:
  determine whether or not the input key is authentic as a function of a comparison of the first hash value to a second hash value;
  in response to the input key being authentic, perform the storing of the encrypted configuration data in the configuration memory and the determining of whether or not the encrypted configuration data is authentic; and
  in response to the input key not being authentic, halt configuration of the programmable resources of a programmable integrated circuit (IC).

14. The circuit of claim 11, wherein the configuration control circuit is further configured to determine whether or not the encrypted configuration data is authentic using asymmetric key cryptography.

15. The circuit of claim 11, wherein:
the signature is generated using a private key; and
the encrypted configuration data includes a configuration header, configuration data for the programmable resources of a programmable integrated circuit (IC), and a configuration footer.

16. The circuit of claim 11, wherein the configuration control circuit is further configured to decrypt the encrypted configuration data using a plurality of keys in the configuration data.

17. The circuit of claim 11, wherein the configuration control circuit is further configured to perform a cyclic redundancy check on the decrypted configuration data before storing the decrypted configuration data in the configuration memory.

18. The circuit of claim 11, further comprising:
a clock control circuit coupled to the configuration control circuit, wherein the clock control circuit, responsive to the configuration control circuit, is configured to:
  operate the circuit at a first clock rate during the inputting of the encrypted configuration data, storing of the encrypted configuration data, and the determining whether or not the encrypted configuration data is authentic; and
  operate the circuit at a second clock rate during the reading, decrypting, and storing of the decrypted configuration data;
wherein the second clock rate is faster than the first clock rate.

19. The circuit of claim 11, wherein:
the configuration bitstream includes the signature, followed by a configuration header, followed by configuration data for the programmable resources, followed by a configuration footer;
the configuration control circuit is further configured to store the configuration header and configuration footer in a buffer; and
the authentication circuit is further configured to generate the actual digest from the configuration header, the configuration data for the programmable resources, and the configuration footer.

20. A method of configuring a programmable integrated circuit (IC), comprising:
inputting a value of a decryption flag to the programmable IC, wherein the programmable IC includes configurable logic and a configuration memory, and a state of the configuration memory controls functions of the configurable logic;
inputting configuration data to the programmable IC;
storing the configuration data in the configuration memory of the programmable IC;
determining whether or not the configuration data is authentic; and
in response to the configuration data being authentic:
  reading the configuration data from the configuration memory;
  in response to the value of a decryption flag indicating that the configuration data is encrypted:
    decrypting the encrypted configuration data into decrypted configuration data; and
    storing the decrypted configuration data back in the configuration memory;
  in response to the value of a decryption flag indicating that the configuration data is not encrypted, storing the configuration data back in the configuration memory; and
operating the programmable IC having the configurable logic of the programmable IC programmed by the decrypted configuration data in the configuration memory.

* * * * *